United States Patent

Okada

(10) Patent No.: US 9,759,572 B2
(45) Date of Patent: Sep. 12, 2017

(54) NAVIGATION APPARATUS THAT CALCULATES ONE OR MORE TRAVELABLE RANGES FOR AN ELECTRIC VEHICLE

(71) Applicant: MITSUBISHI ELECTRIC CORPORATION, Tokyo (JP)

(72) Inventor: Tomo Okada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 70 days.

(21) Appl. No.: 14/432,074

(22) PCT Filed: Nov. 6, 2012

(86) PCT No.: PCT/JP2012/078675
§ 371 (c)(1),
(2) Date: Mar. 27, 2015

(87) PCT Pub. No.: WO2014/073028
PCT Pub. Date: May 15, 2014

(65) Prior Publication Data
US 2015/0247734 A1    Sep. 3, 2015

(51) Int. Cl.
*G01C 21/34* (2006.01)
*B60L 11/18* (2006.01)
(Continued)

(52) U.S. Cl.
CPC ............ *G01C 21/3469* (2013.01); *B60L 3/12* (2013.01); *B60L 11/1861* (2013.01);
(Continued)

(58) Field of Classification Search
None
See application file for complete search history.

(56) References Cited

U.S. PATENT DOCUMENTS 5,539,399 A     7/1996    Takahira et al.
6,864,807 B2    3/2005    Todoriki et al.
(Continued)

FOREIGN PATENT DOCUMENTS

DE    10 2009 040 966 A1    3/2011
DE    10 2011 015 778 A1    10/2012
(Continued)

OTHER PUBLICATIONS

WIPO Machine translation of WO2012114381 (Arita Sep. 14, 2016).*

(Continued)

*Primary Examiner* — Fadey Jabr
*Assistant Examiner* — Kevin P Mahne
(74) *Attorney, Agent, or Firm* — Birch, Stewart, Kolasch & Birch, LLP

(57) ABSTRACT

An object of the present invention is to provide a technique capable of predicting whether a vehicle can reach a desired facility or point by traveling on a retrieved route to the destination. A navigation apparatus includes an information storage that stores map information, a current position detector that detects a current position of the vehicle, an instruction receiver that receives a setting of a destination, and a vehicle information receiver that receives information on a remaining amount of the electricity charged. The navigation apparatus further includes a processing circuitry that retrieves a route to the destination from the map information and calculates a first travelable range in which the vehicle is allowed to travel from the current position through at least a part of the route to cause the first travelable range to be displayed.

7 Claims, 8 Drawing Sheets

(51) Int. Cl.
*B60L 3/12* (2006.01)
*G01C 21/36* (2006.01)

(52) U.S. Cl.
CPC ........ *G01C 21/34* (2013.01); *B60L 2240/547* (2013.01); *B60L 2240/549* (2013.01); *B60L 2240/622* (2013.01); *B60L 2240/645* (2013.01); *B60L 2250/10* (2013.01); *B60L 2250/16* (2013.01); *B60L 2260/52* (2013.01); *B60L 2260/54* (2013.01); *G01C 21/3673* (2013.01); *G01C 21/3679* (2013.01); *Y02T 10/7005* (2013.01); *Y02T 10/705* (2013.01); *Y02T 10/7044* (2013.01); *Y02T 10/7291* (2013.01); *Y02T 90/16* (2013.01); *Y02T 90/161* (2013.01); *Y02T 90/162* (2013.01)

(56) References Cited

U.S. PATENT DOCUMENTS

| | | | |
|---|---|---|---|
| 8,417,401 | B2 | 4/2013 | Takahara et al. |
| 9,291,469 | B2 | 3/2016 | Hoch et al. |
| 2007/0021909 | A1 | 1/2007 | Matsuda |
| 2010/0094496 | A1* | 4/2010 | Hershkovitz ............. B60L 3/12 701/22 |
| 2013/0282265 | A1* | 10/2013 | Arita ....................... G06F 17/00 701/123 |
| 2014/0052373 | A1 | 2/2014 | Hoch et al. |

FOREIGN PATENT DOCUMENTS

| | | | | |
|---|---|---|---|---|
| DE | 10 2012 003 292 | A1 | 6/2013 | |
| DE | 10 2012 001 163 | A1 | 7/2013 | |
| JP | 2-210598 | A | 8/1990 | |
| JP | 07 85397 | A | 3/1995 | |
| JP | 09-119839 | A | 5/1997 | |
| JP | 2003-21522 | A | 1/2003 | |
| JP | 2007-24833 | A | 2/2007 | |
| JP | 2007-293823 | A | 11/2007 | |
| JP | 2008-32542 | A | 2/2008 | |
| JP | 2009-25128 | A | 2/2009 | |
| JP | 2010-122117 | A | 6/2010 | |
| JP | 2011-145255 | A | 7/2011 | |
| JP | 2012085436 | A * | 4/2012 | ................ H02J 3/14 |
| JP | 2012-181099 | A | 9/2012 | |
| WO | WO 2011/101885 | A1 | 8/2011 | |
| WO | WO 2012/114381 | A1 | 8/2012 | |
| WO | WO2012114381 | * | 8/2012 | ............. G06F 17/00 |

OTHER PUBLICATIONS

JPO machine translation of JP2007-293823 (Osamu Sep. 14, 2016).*
JP 2012085436 A, Ikeda et. al., Description, EPO machine translation Feb. 11, 2017.*
JP 2012085436 A, Ikeda et. al., Claims, EPO machine translation Feb. 11, 2017.*

* cited by examiner

F I G . 3
```
DISPLAY SETTING
ON-ROUTE DISPLAY              [ ON ]    [ OFF ]
TRAVELABLE RANGE DISPLAY      [ ON ]    [ OFF ]
CHARGING STATION ICON DISPLAY [ ON ]    [ OFF ]
[ RETURN ]
```
F I G . 4
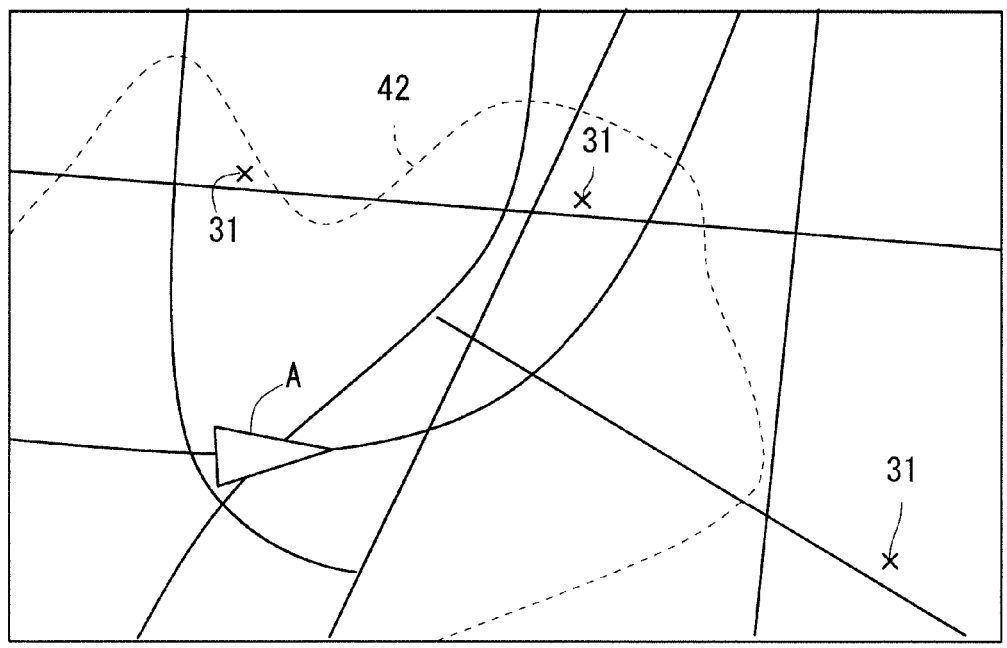

FIG. 11

| | STATE | 1 | 2 | 3 | 4 | 5 | 6 | 7 | 8 |
|---|---|---|---|---|---|---|---|---|---|
| PRESENCE OR ABSENCE OF CHARGING STATIONS IN EACH RANGE | BLUE (RANGE 41a) | ○ | ○ | ○ | ○ | × | × | × | × |
| | YELLOW (RANGE 41b) | ○ | ○ | × | × | ○ | ○ | × | × |
| | RED (RANGE 42) | ○ | × | ○ | × | ○ | × | ○ | × |
| PRESENCE OR ABSENCE OF NOTIFICATION | ALARM | × | ○ | ○ | ● | ○ | ● | ● | ● |
| | TELOP DISPLAY | ○ | ○ | ○ | ● | ○ | ● | ● | ● |

NAVIGATION APPARATUS THAT CALCULATES ONE OR MORE TRAVELABLE RANGES FOR AN ELECTRIC VEHICLE

TECHNICAL FIELD

The present invention relates to a navigation apparatus to be mounted on or used in a vehicle that runs on electricity charged in a battery.

BACKGROUND ART

In recent years, attempts have been made worldwide to preserve the global environment by suppressing environmental destruction and global warming. These attempts include the promotion of development and sales of electric vehicles that run on electricity charged in batteries and discharge no exhaust gas and hybrid vehicles that discharge small amount of exhaust gas (hereinafter collectively referred to as electric vehicles, which are abbreviated as EVs).

For a long-distance driving, such an EV needs, in some cases, battery charging at the point of departure, at the destination, or in the middle of the route from the point of departure to the destination, depending on, for example, the capacity of the mounted battery. Unfortunately, charging stations (charging facilities) have not yet become widespread at this point in time. Thus, the EV in need of charging in the middle of the route must be able to reach one of few charging stations without fail.

Therefore, as for navigation apparatuses to be mounted on the EVs, there has been proposed the technique for calculating the travelable range in which the EV is allowed to travel from the current position through a given route by consuming the remaining amount of the electricity charged in the battery and for displaying the travelable range on the map.

For example, in Patent Documents 1 to 4, the techniques for calculating the travelable range with consideration given to the gradient of each road shown on the road map have been proposed. In Patent Document 5, the technique for calculating the travelable range for each of charge times and displaying a plurality of calculated travelable ranges to be distinguishable from one another has been proposed.

PRIOR ART DOCUMENTS

Patent Documents

Patent Document 1: Japanese Patent Application Laid-Open No. 07-085397 (1995)
Patent Document 2: Japanese Patent Application Laid-Open No. 09-119839 (1997)
Patent Document 3: Japanese Patent Application Laid-Open No. 2010-122117
Patent Document 4: Japanese Patent Application Laid-Open No. 2003-021522
Patent Document 5: Japanese Patent Application Laid-Open No. 2009-025128

SUMMARY OF INVENTION

Problem to be Solved by the Invention

In a case where such a navigation apparatus mentioned above shows a charging station within the travelable range and displays the charging station near a route to the destination that has been previously retrieved (retrieved route), a vehicle traveling on the retrieved route is assumed to be capable of reaching the charging station. In some cases, however, the vehicle cannot actually reach the charging station unless the vehicle diverges from the retrieved route early on and takes another route that is different from the retrieved route. If this is the case, unfortunately the vehicle traveling on the retrieved route cannot reach the charging station.

The present invention therefore has been made in view of the above-mentioned problem, and an object thereof is to provide a technique capable of predicting whether a vehicle can reach a desired facility such as a charging station or a desired point by traveling on the retrieved route to the destination.

Means to Solve the Problem

A navigation apparatus according to the present invention is to be mounted on or used in a vehicle that runs on electricity charged in a battery and includes an information storage that stores map information, a current position detector that detects a current position of the vehicle, an instruction receiver that receives a setting of a destination, and a vehicle information receiver that receives information on a remaining amount of the electricity charged. The navigation apparatus further includes a processing circuitry that retrieves a route to the destination from the map information and calculates a first travelable range in which the vehicle is allowed to travel from the current position through at least a part of the route on the basis of the route, the remaining amount of the electricity charged, the current position, and the map information to cause a display to display the first travelable range. The processing circuitry calculates, regardless of whether the destination is set, a second travelable range in which the vehicle is allowed to travel from the current position through a given route on the basis of the remaining amount of the electricity charged, the current position, and the map information to cause the display to display the second travelable range. The processing circuitry switches, depending on whether the destination is set, one of displays of the first and second travelable ranges and a display of the second travelable range to the other.

Effects of the Invention

According to the present invention, the first travelable range in which the vehicle is allowed to travel from the current position through at least a part of the route is calculated and the first travelable range is displayed on the display. This allows a user to know, in advance, whether the vehicle can reach the desired facility such as the charging station or the desired point by traveling on the retrieved route to the destination.

BRIEF DESCRIPTION OF DRAWINGS

FIG. 3 illustrates a display setting screen according to the first embodiment.

FIG. 4 illustrates an operation of the navigation apparatus according to the first embodiment.

FIG. 11 illustrates a notification setting screen according to a first modification of the first embodiment.

DESCRIPTION OF EMBODIMENTS

<First Embodiment>

Figure 1:
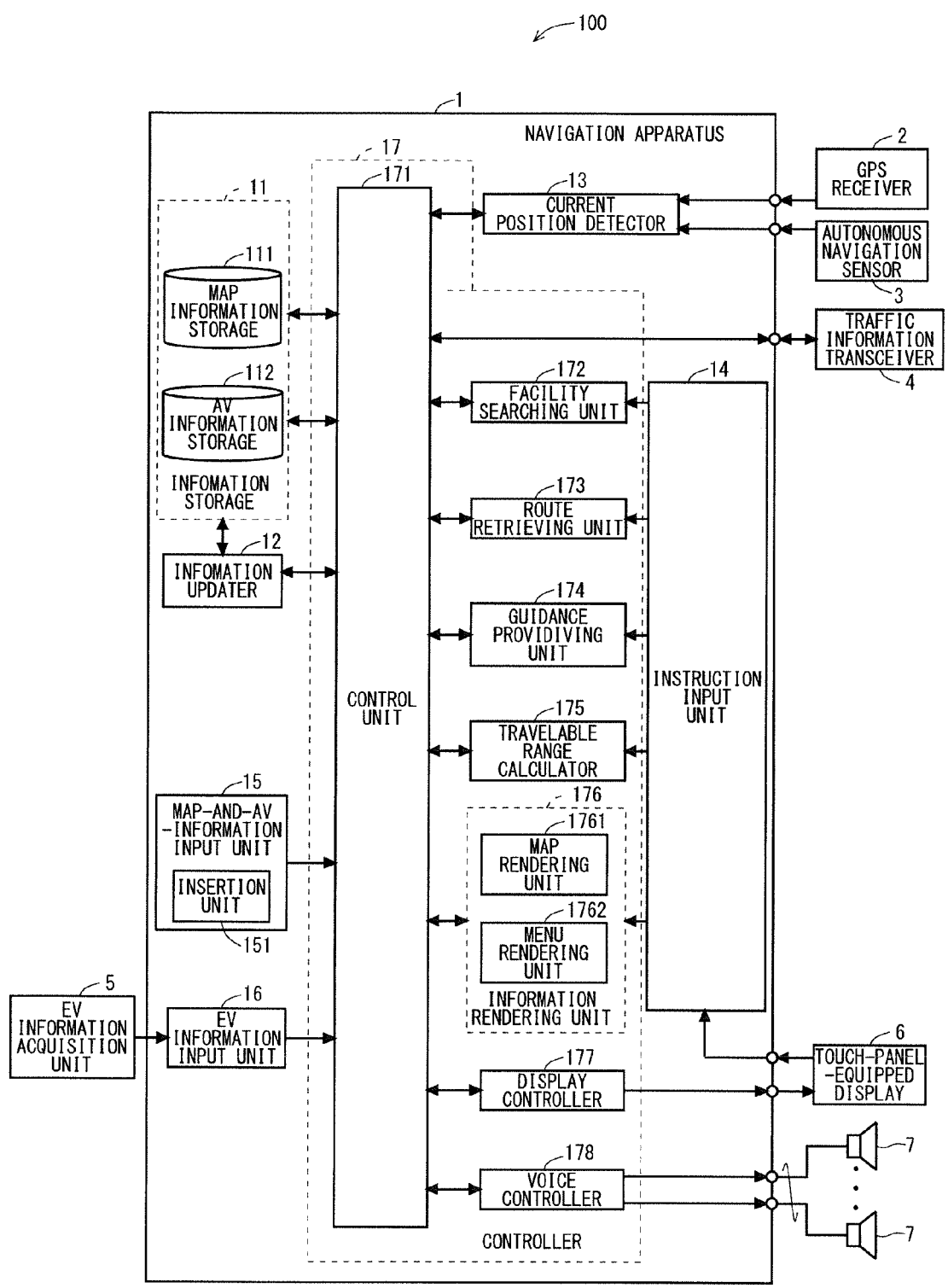
FIG. 1 is a block diagram illustrating a configuration of a map information processing device including a navigation apparatus according to a first embodiment.

FIG. 1 is a block diagram illustrating a configuration of a map information processing device 100 that includes a navigation apparatus 1 according to a first embodiment of the present invention. The description is given assuming that the navigation apparatus 1 is an on-vehicle navigation apparatus and the vehicle including the navigation apparatus 1 mounted thereon is an EV (hereinafter also referred to as "own vehicle") that runs on electricity charged in a battery.

The map information processing device 100 is configured to include the navigation apparatus 1, a global positioning system (GPS) receiver 2, an autonomous navigation sensor 3, a traffic information transceiver 4, an EV information acquisition unit 5, and a touch-panel-equipped display 6 and speakers 7 that constitute an audio visual (AV) device. The GPS receiver 2, the autonomous navigation sensor 3, the traffic information transceiver 4, the EV information acquisition unit 5, the touch-panel-equipped display 6, and the speakers 7 are, as with the navigation apparatus 1, mounted on the own vehicle and capable of communicating with the navigation apparatus 1 via wire or wireless transmission.

Next, constituent elements of the navigation apparatus 1 are briefly described.

The navigation apparatus 1 is configured to include an information storage 11, an information updater 12, a current position detector 13, an instruction input unit 14, a map-and-AV-information input unit 15, an EV information input unit 16 (vehicle information input unit), and a controller 17. The controller 17 includes a control unit 171 that controls the whole of the map information processing device 100 by centrally controlling the information storage 11, the information updater 12, the current position detector 13, the instruction input unit 14, the map-and-AV-information input unit 15, and the EV information input unit 16.

The information storage 11 stores various kinds of information including the map information (information related to maps) and the AV information (information related to voices, images, or both). The information updater 12 updates various kinds of information stored in the information storage 11 on the basis of the instructions given by the control unit 171. The current position detector 13 detects the current position and the traveling direction of the own vehicle on the basis of the signals received from the GPS receiver 2 and the autonomous navigation sensor 3. The instruction input unit 14 receives various kinds of input including the setting of the destination from a user and provides the controller 17 with the input. The map-and-AV-information input unit 15 provides the controller 17 with the map information or the AV information received from the outside. The EV information input unit 16 provides the controller 17 with the EV information (information related to the EV including the remaining amount of the electricity charged in the battery) received from the EV information acquisition unit 5.

Next, constituent elements of the controller 17 are briefly described.

The controller 17 is configured to include, besides the control unit 171 described above, a facility searching unit 172, a route retrieving unit 173, a guidance providing unit 174, a travelable range calculator 175, an information rendering unit 176, a display controller 177 and a voice controller 178. Although the constituent elements included in the navigation apparatus 1 exchange various kinds of information with one another via the control unit 171, the involvement of the control unit 171 is omitted from the following description for the sake of simplification.

The facility searching unit 172 searches the information storage 11 for a desired facility, a desired location, and the like on the basis of the input information received by the instruction input unit 14. The route retrieving unit 173 retrieves, from the information storage 11, a desirable route for a vehicle to reach the destination on the basis of the input information including the destination received by the instruction input unit 14 and of the current position detected by the current position detector 13. In the following description, the route retrieved by the route retrieving unit 173 may also be referred to as the "retrieved route."

The guidance providing unit 174 acquires, from the information storage 11, the guidance information (for example, the information on the direction to be traveled) for guiding the user at a predetermined key point on the basis of the current position detected by the current position detector 13 and of the route (retrieved route) retrieved by the route retrieving unit 173.

The travelable range calculator 175 calculates the travelable range in which the EV is allowed run on the remaining amount of the electricity charged from the current position on the basis of the map information stored in the information storage 11, the current position detected by the current position detector 13, and the remaining amount of the electricity charged that is included in the EV information provided by the EV information input unit 16.

The information rendering unit 176 performs information processing on, for example, the map information that is read out from the information storage 11 by the control unit 171, to thereby generate the rendering information for visually rendering (displaying) the read information. Moreover, the information rendering unit 176 generates the rendering information for visually rendering (displaying) the menu screen on which various kinds of functions of the navigation apparatus 1 are to be set.

The display controller 177 controls the display of the touch-panel-equipped display 6 on the basis of the rendering information generated by the information rendering unit 176. The voice controller 178 controls the voice output of the speakers 7 on the basis of the voice information that is included in the AV information provided by the map-and- AV-information input unit 15 or of the voice information that is included in the guidance information acquired by the guidance providing unit 174.

Next, each of the constituent elements is described in detail.

The information storage 11 stores the information required for, for example, the navigation function or the entertainment function. The information storage 11 includes a map information storage 111 that stores the map information and an AV information storage 112 that stores the AV information. The information storage 11 is formed of pieces of hardware such as a hard disk drive (HDD) and a memory device (for example, a DRAM) including a semiconductor element. The map information storage 111 and the AV information storage 112 may be formed of one piece of hardware or may be individually formed of separate pieces of hardware.

The map information stored in the map information storage 111 includes a plurality of maps that are hierarchically organized for each of the predetermined scales and the map display information that is to be displayed along with the maps. The map display information includes the road information related to roads (information including road names, road gradients, road types such as an expressway or an open road, and road locations), the facility information related to facilities (information including facility names, facility types, and facility locations), various kinds of character information (character information including place names, facility names, intersection names, and road names), and various kinds of icon information (icon information including facilities and road numbers).

Besides the above information, the map information storage 111 stores the guidance information (including the location information of a predetermined key point, the rendering information to be displayed at the predetermined key point, and the voice information for guidance to be output by voice) acquired by the guidance providing unit 174 and the data information that is not displayed on the touch-panel-equipped display 6. The data information that is not displayed on the touch-panel-equipped display 6 includes, the information for representing a road by line segments referred to as links and points referred to as nodes, the link cost for each link that is used for retrieving a route, and a wide variety of other information.

The information updater 12 performs, for example, partial update, partial addition, partial deletion, total deletion, or total update on various kinds of information including the map information and the AV information stored in the information storage 11 on the basis of the instructions given by the control unit 171.

The GPS receiver 2 constitutes the satellite navigation system for measuring the current position of the EV (own vehicle) by radio waves from GPS satellites. The autonomous navigation sensor 3, in which various kinds of sensors detect the current position and the direction of the own vehicle to constitute the autonomous navigation system, includes a direction sensor that detects the direction of the own vehicle and a travel distance sensor that detects the travel distance by detecting the number of wheel rotations of the own vehicle.

In this embodiment, the current position detector 13, which jointly employs the satellite navigation system and the autonomous navigation system that have been described above, detects the current position and the traveling direction of the own vehicle on the basis of the signals transmitted from the GPS receiver 2 and the autonomous navigation sensor 3. The current position detector 13 performs map matching based on the map information (a method for determining the current position that is most probable by comparing the road information included in the map information, the travel trace of the own vehicle including the latest right-hand turn and left-hand turn, and the current position detected on the basis of the signals transmitted from the GPS receiver 2 and the autonomous navigation sensor 3). The current position detector 13 configured as described above enhances the accuracy of detecting the current position of the own vehicle.

The current position detector 13 has been described as the hybrid-type detector that jointly employs the satellite navigation system and the autonomous navigation system, which is not limited thereto. For example, the current position detector 13 may employ one of these navigation systems.

The traffic information transceiver 4 receives and transmits the traffic information as needed or at a given point in time. The traffic information transceiver 4 receives the traffic information including the congestion state, the congestion distance, the traffic restrictions, and the required travel time of each road from, for example, the FM multiplex broadcasting, the radio beacons, and the light beacons of the vehicle information and communication system (VICS) (registered trademark).

In recent years, the dedicate short range communication (DSRC) is gradually being employed as the wireless communication system of vehicles. The DSRC is applied to the two-way communication or the one-way communication between the road-side unit and the on-vehicle unit, providing users with various services. In line with the trend, a transceiver that is capable not only of receiving the above information but also of transmitting, for example, the information related to the own vehicle (including the current position and travel speed of the own vehicle) and the traffic information including the probe information is used as the traffic information transceiver 4 according to the first embodiment. Alternatively, for the configuration in which the need for transmitting the traffic information from the own vehicle is eliminated, the navigation apparatus 1 may include, in place of the traffic information transceiver 4, a traffic information receiver formed of a receiving device dedicated to receiving the traffic information.

The instruction input unit 14 receives various kinds of input (instructions) including the setting of the destination from the user and provides the controller 17 with the input (instructions). The instruction input unit 14 in this embodiment is configured to receive the input from the user via the touch-panel-equipped display 6. However, the instruction input unit 14 is not limited thereto. For example, the touch-panel-equipped display, the switch of the hardware, or the voice recognition device that recognizes and receives the voice of the user, which is included in the navigation apparatus 1 in some cases, may be used as the instruction input unit 14. Alternatively, a remote control located on, for example, the steering wheel or the recognition device that recognizes input from a separate remote control may be used as the instruction input unit 14.

The map-and-AV-information input unit 15 receives the map information or the AV information from the outside and provides the controller 17 with the received information. In the first embodiment, the map-and-AV-information input unit 15 includes an insertion unit 151 that receives a medium having the map information or the AV information recorded thereon, such as a disk medium typified by, for example, a CD-ROM and a DVD and a semiconductor medium typified by a SD card. The map-and-AV-information input unit 15 is configured to load the map information or the AV information from the medium inserted into the insertion unit 151. The map-and-AV-information input unit 15 configured as described above can serve to update the information in the information storage 11 upon receipt of the map information or the AV information from the outside.

The map-and-AV-information input unit 15 can store, as needed, the map information or the AV information received from the outside. Therefore, the map-and-AV-information input unit 15 can also function as the information storage 11. Thus, the navigation apparatus 1 may be configured such that the information storage 11 stores the information loaded by the map-and-AV-information input unit 15, or alternatively, the navigation apparatus 1 may be configured such that the map-and-AV-information input unit 15 takes over the functions of the information storage 11, whereby the map-and-AV-information input unit 15 is substituted for the information storage 11.

In a case where the map-and-AV-information input unit 15 is configured to have the communication function, the map information in the required range may be acquired as needed through the communication performed by the map-and-AV-information input unit 15 and the information updater 12 may update the map information stored in the information storage 11 on the basis of the acquired map information.

The EV information input unit 16 receives the EV information from the EV information acquisition unit 5 and provides the controller 17 with the EV information. The EV information includes the battery charge information related to the remaining amount of the electricity charged in the battery mounted on the own vehicle, the vehicle type information related to the type of the own vehicle, and the travel record information related to the past travel record of the own vehicle (including the record that correlates the travel distance with the electricity in the battery consumed in traveling). The EV information input unit 16 is capable of updating the EV information stored in the navigation apparatus 1 on the basis of the EV information received from the EV information acquisition unit 5. The EV information input unit 16 can store the EV information received from the EV information acquisition unit 5 when required, such that the EV information input unit 16 is also capable of functioning as the information storage 11.

The controller 17 is capable of calculating the distance which the own vehicle is allowed to travel by consuming the unit electricity in the battery (hereinafter referred to as the "travelable distance per unit electricity") on the basis of the past travel record of the own vehicle included in the EV information. The travelable distance per unit electricity is important in the following description of the operation.

When the instruction input unit 14 receives, for example, a facility or a place, the facility searching unit 172 searches the map information storage 111 for the facility or the place. The search results obtained by the facility searching unit 172 undergo the information processing performed by the information rendering unit 176, and then, are displayed on, for example, the touch-panel-equipped display 6, thereby being displayed (presented) to the user.

When the instruction input unit 14 receives, for example, a destination or a via point, the route retrieving unit 173 retrieves, from the map information, the route that passes through the destination, the via point, and the current position of the own vehicle detected by the current position detector 13. The kinds of routes retrieved by the route retrieving unit 173 (retrieval kinds) include the route for earlier arrival time (time priority route), the route for shorter travel distance (distance priority route), the route for low fuel consumption (fuel-consumption priority route), the route for the utmost use of toll roads (toll-road priority route), the route for the utmost use of open roads (open-road priority route), or the route for better balance among time, distance, and cost (standard route). In retrieving a route, the route retrieving unit 173 employs, for example, the publicly known Dijkstra method for summing the link cost of each link (each road) corresponding to the above-mentioned retrieval kinds and acquiring the route that includes the link (road) in which the sum is minimized.

The information rendering unit 176 performs information processing on the route retrieved by the route retrieving unit 173, and then, the touch-panel-equipped display 6 displays (presents) the route to the user. A plurality of routes may be displayed for each retrieval kind. As to the distance priority, for example, not only the route for the shortest travel distance but also the route in which the travel distance is increased by a given distance or a given percentage of distance may be displayed.

The guidance providing unit 174 acquires the guidance information from the information storage 11 on the basis of the current position of the own vehicle detected by the current position detector 13 and the route retrieved by the route retrieving unit 173. The guidance information serves to prevent the user's confusion during traveling at certain key points including a point, such as an intersection or a branch point, at which the own vehicle traveling on the retrieved route needs to change direction, a commonly-confused point, or a point on a multi-lane road at which the own vehicle needs to change lanes (for example, a point short of an intersection on the road). More specifically, the guidance information includes the information for notifying the user of, as the lane change notice on the multi-lane road, the lane corresponding to the turn direction (right or left turn) to be taken beyond the current position The information rendering unit 176 performs infocation processing on the guidance information acquired by the guidance providing unit 174, and then, the touch-panel-equipped display 6 displays (present) the guidance information to the user. Alternatively, the speaker 7 may output the guidance information acquired by the guidance providing unit 174 by voice.

Therefore, when the own vehicle reaches the intersection predetermined as the key point, for instance, the touch-panel-equipped display 6 can display the direction or road to be chosen at the intersection with a distinctive color or an arrow added thereto. In this case, one of the double screens, which are displayed on the touch-panel-equipped display 6, may display the magnified guide map shown under magnification or under magnification and deformation or may display the actual image of the intersection or the similar image.

The travelable range calculator 175 (the controller 17) calculates a first travelable range in which the own vehicle is allowed to travel from the current position through at least a part of the retrieved route on the basis of the retrieved route obtained by the route retrieving unit 173, the remaining amount of the electricity charged that is included in the EV information, the current position detected by the current position detector 13, and the map information stored in the information storage 11. The travelable range calculator 175 (the controller 17) according to the first embodiment calculates not only the first travelable range but also a second travelable range in which the own vehicle is allowed to travel from the current position through a given route on the basis of the remaining amount of the electricity charged that is included in the EV information, the current position detected by the current position detector 13, and the map information stored in the information storage 11.

The calculation of the first and second travelable ranges will be described later in detail. The information rendering unit 176 performs information processing on the first and second travelable ranges calculated by the travelable range calculator 175, and then, the touch-panel-equipped display 6 displays (presents) the travelable ranges to the user.

The information rendering unit 176 generates the rendering information for displaying (rendering) various kinds of information including characters and images on the touch-panel-equipped display 6. In this embodiment, the information rendering unit 176 includes at least a map rendering unit 1761 that renders a desired map on the basis of the map information corresponding to the instructions provided by the user and a menu rendering unit 1762 that controls the state of the menu screen and also renders the menu screen.

The map rendering unit 1761 performs information processing on the information received from the map information storage 111, the current position detector 13, the facility searching unit 172, the route retrieving unit 173, the guide providing unit 174, and the travelable range calculator 175, to thereby generate the rendering information to be displayed on the touch-panel-equipped display 6 and output the generated rendering information to the display controller 177. The display controller 177 outputs an instruction such that the touch-panel-equipped display 6 connected to the display controller 177 displays (renders) the output (such as a map and a retrieved route) from the map rendering unit 1761. The display controller 177 outputs an instruction as needed such that the touch-panel-equipped display 6 displays (renders) the image information stored in the AV information storage 112.

The menu rendering unit 1762, which has the function of displaying the menu on the basis of the user's input (instructions) obtained by the instruction input unit 14, outputs an instruction via the display controller 177 such that the touch-panel-equipped display 6 displays (renders) the desired menu screen.

The touch-panel-equipped display 6 displays the information based on the instruction output of the display controller 177. Meanwhile, the above-described menu screen includes the setting of a touch switch located on the display screen of the touch-panel-equipped display 6. When the user operates the touch switch, the operation information is input to the instruction input unit 14.

The voice controller 178 outputs an instruction such that the speaker 7 outputs voice upon receipt of the guidance information from the guidance providing unit 174. The voice controller 178 performs control such that one of the plurality of speakers 7 that is closer to the driver's seat outputs the guidance information. The plurality of speakers 7 are not necessarily of the same kind and may include different kinds of speakers, for example, the speaker that mainly outputs high-pitched sounds, the speaker that mainly outputs mid-range sounds, and the speaker that mainly outputs low-pitched sounds. Note that, for better audibility, the speaker that mainly outputs midrange sounds is preferable as the speaker 7 for outputting the guidance information.

On the one hand, the voice controller 178 instructs each of the speakers 7 to output the voice information stored in the AV information storage 112 or the voice information obtained from the map-and-AV-information input unit 15. In a case where the information obtained from the AV information storage 112 and the map-and-AV-information input unit 15 includes both the voice information and the image information similarly to the AV information as in television broadcasting and DVDs, the voice controller 178 instructs the speaker 7 to output the voice information. On the other hand, the display controller 177 instructs the touch-panel-equipped display 6 to output the image information mentioned above. Thus, the entertainment functions are implemented by the cooperation of the display controller 177 and the voice controller 178. In a case where the navigation apparatus 1 includes a built-in speaker (not shown) besides the speaker 7, the speaker 7 may output the AV information and the built-in speaker of the navigation apparatus 1 may output the guidance information.

<Operation>

Figure 2:
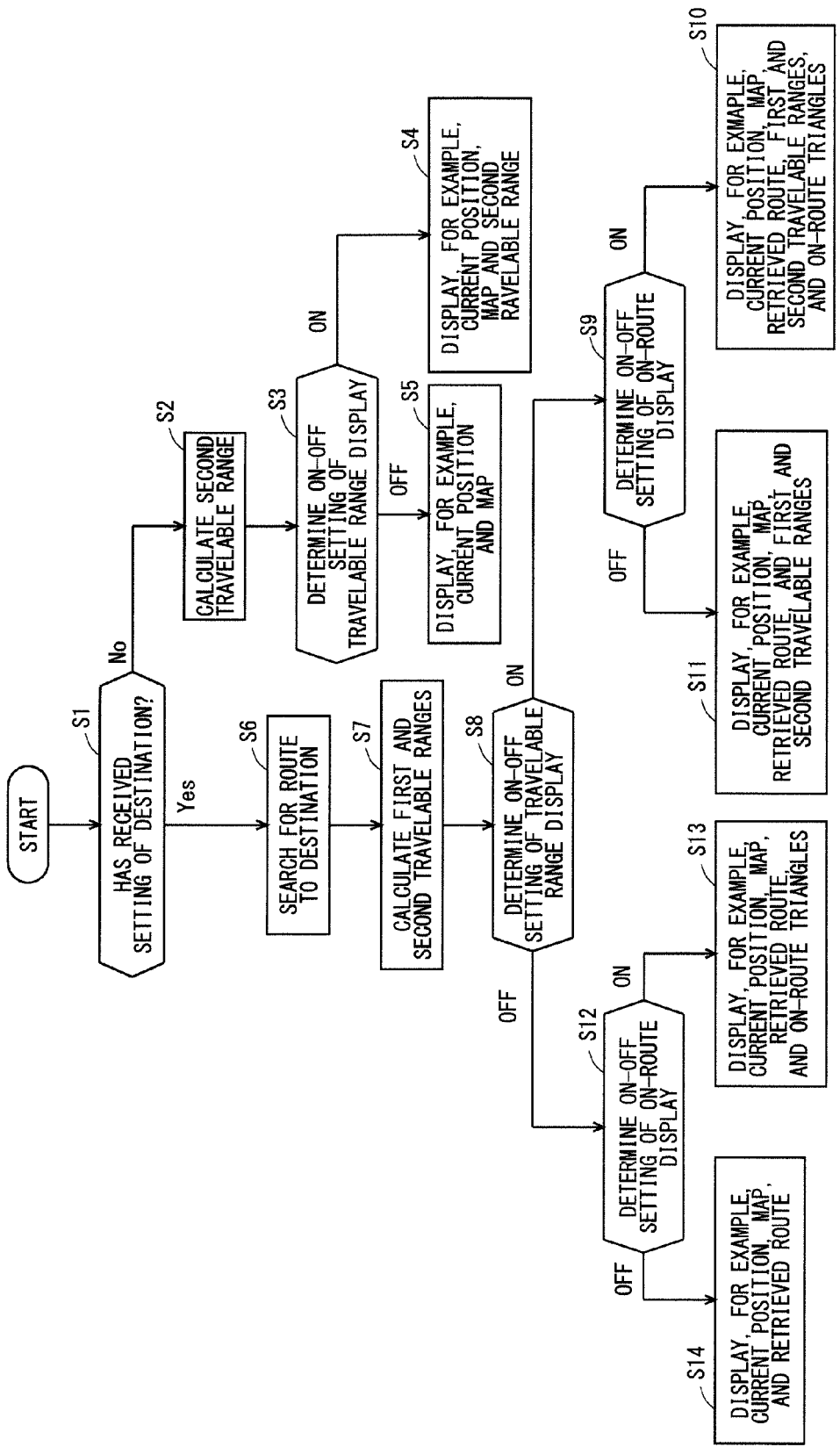
FIG. 2 is a flowchart illustrating an operation of the navigation apparatus according to the first embodiment.

FIG. 2 is a flowchart illustrating an operation of the navigation apparatus 1 according to the first embodiment. The operation is performed on premises that each item on the display setting screen as shown in FIG. 3, namely, "on-route display," "travelable range display," and "charging station icon display" have already been set. The display setting screen, on which the display of the touch-panel-equipped display 6 is set, is displayed on the touch-panel-equipped display 6 through the control of the navigation apparatus 1.

To set ON and OFF of each item on the display setting screen, the user inputs ON or OFF of each item to the touch-panel-equipped display 6 when the display setting screen is displayed on the touch-panel-equipped display 6. The settings input by the user are controlled by the controller 17 via, for example, the instruction input unit 14, thereby being stored in the information storage 11. This configuration allows the user to choose whether the display relating to each item will be performed by setting ON or OFF for each item on the display setting screen as needed, thereby realizing the display adapted to, for example, the travel condition, the usage condition, and the age bracket of the user.

Next, the operation of the navigation apparatus 1 is described with reference to the flowchart shown in FIG. 2.

Firstly, in a step S1, the controller 17 determines whether the instruction input unit 14 has received the setting of the destination. If the setting has not been received, the processing proceeds to a step S2. If the setting has been received, the processing proceeds to a step S6.

In the step S2, the controller 17 (the travelable range calculator 175) calculates the second travelable range in which the own vehicle is allowed to travel from the current position through a given route on the basis of the current remaining amount of the electricity charged that is included in the EV information, the current position detected by the current position detector 13, and the map information stored in the information storage 11.

FIG. 4 illustrates an example of the second travelable range calculated in the step S2. FIG. 4 shows an isosceles triangle mark that is affixed to a current position A of the own vehicle and has the vertex angle portion pointed to the traveling direction of the own vehicle, a map showing the vicinity of the current position A, cross icons indicating charging stations 31, and a second travelable range 42. Next, with reference to FIG. 4, the calculation of the second travelable range 42 performed by the controller 17 (the travelable range calculator 175) is described.

The controller 17 multiplies the travelable distance per unit electricity described above (the distance which the own vehicle is allowed to travel by consuming the unit electricity in the battery) with the current remaining amount of the electricity charged that is included in the EV information, to thereby calculate the distance which the own vehicle is allowed to travel by consuming the remaining amount of the electricity charged (hereinafter referred to as "travelable distance by the use of the remaining amount of the electricity charged"). The controller 17 comprehensively obtains a plurality of points which the own vehicle is allowed to reach for the case that the own vehicle travels the travelable distance by the use of the remaining amount of the electricity charged on a route (road) from the current position A. Then, the controller 17 calculates the second travelable range 42, which is assumed to be the range defined by a closed line connecting some of the plurality of calculated points (for example, some of the most distant points from the current position A). The method for calculating the second travelable range 42 is not limited the above. Alternatively, the second travelable range 42 may be calculated by various methods described in the prior art documents.

The controller 17 may correct the travelable distance by the use of the remaining amount of the electricity charged (namely, the second travelable range 42) depending on the route (road) gradient and the route (road) type (an expressway or an open road). Specifically, corrections may be made such that the travelable distance by the use of the remaining amount of the electricity charged is shortened for a road with a steep uphill gradient (or is extended for a road with a downhill gradient) and that the travelable distance by the use of the remaining amount of the electricity charged is extended for an expressway in which fuel consumption can be reduced compared to an open road).

In a step S3 (FIG. 2), the controller 17 determines whether the travelable distance display is set to ON or OFF on the display setting shown in FIG. 3. If the travelable distance display is set to ON, the processing proceeds to a step S4. If the travelable distance display is set to OFF, the processing proceeds to a step S5.

If the charging station icon display is set to ON on the display setting shown in FIG. 3, the controller 17 causes, in the step S4, the touch-panel-equipped display 6 to display the details shown in FIG. 4 (the current position A, the map showing the vicinity of the current position A, the charging stations 31, and the second travelable range 42). If the charging station icon display is set to OFF on the display setting shown in FIG. 3, meanwhile, the controller 17 causes the touch-panel-equipped display 6 to display the details shown in FIG. 4 (the current position A, the map showing the vicinity of the current position A, and the second travelable range 42) except for the charging stations 31. Once the step S4 ends, the processing ends as shown in FIG. 2, which is not limited thereto. For example, after the step S4, the processing may return to the step S1 at any time or at a given point in time.

If the charging station icon display is set to ON on the display setting shown in FIG. 3, the controller 17 causes, in the step S5, the touch-panel-equipped display 6 to display the details shown in FIG. 4 (the current position A, the map showing the vicinity of the current position A, and the charging stations 31) except for the second travelable range 42. If the charging station icon display is set to OFF on the display setting shown in FIG. 3, meanwhile, the controller 17 causes the touch-panel-equipped display 6 to display the details shown in FIG. 4 (the current position A and the map showing the vicinity of the current position A) except for the charging stations 31 and the second travelable range 42. Once the step S5 ends, the processing ends as shown in FIG. 2, which is not limited thereto. For example, after the step S5, the processing may return to the step S1 at any time or at a given point in time.

Figure 5:
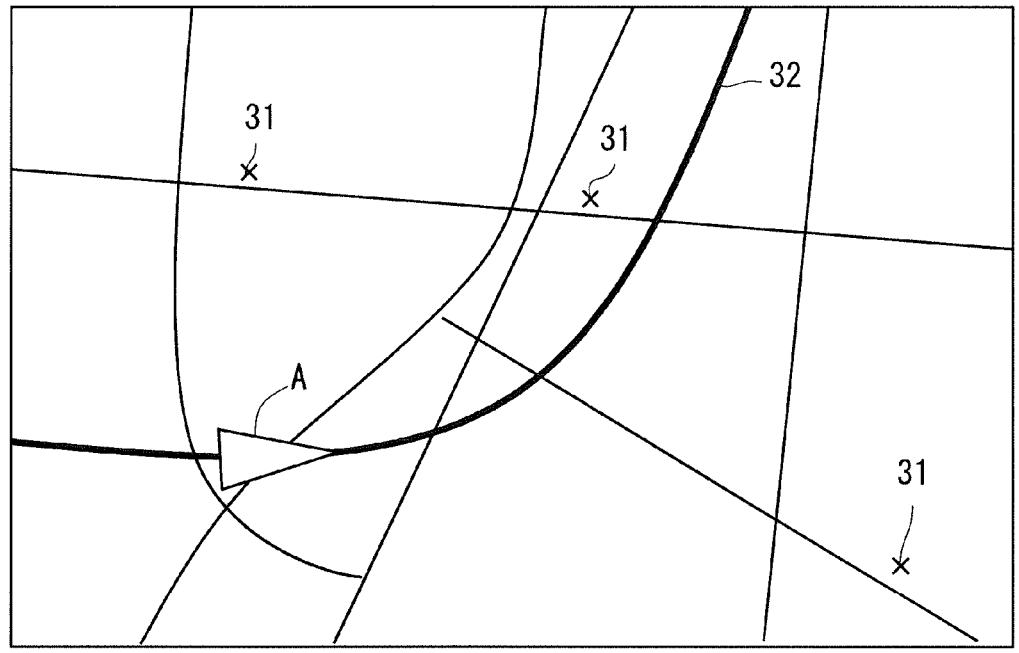
FIG. 5 illustrates the operation of the navigation apparatus according to the first embodiment.

In the step S6, the controller 17 (the route retrieving unit 173) retrieves, from the map information, the route from the current position to the destination. In the first embodiment, the controller 17 (the route retrieving unit 173) retrieves, from the map information, the route that passes through the destination received by the instruction input unit 14, the via points as required, and the current position of the own vehicle detected by the current position detector 13. In FIG. 5, an example of the route (a retrieved route 32) retrieved by the controller 17 (the route retrieving unit 173) is indicated by a thick line.

In a step S7, the controller 17 (the travelable range calculator 175) calculates the first travelable range in which the own vehicle is allowed to travel from the current position through at least a part of the retrieved route 32 on the basis of the retrieved route 32 obtained in the step S6, the current remaining amount of the electricity charged that is included in the EV information, the current position detected by the current position detector 13, and the map information stored in the information storage 11. In the first preferred embodiment, the controller 17 (the travelable range calculator 175) calculates, in the step S7 mentioned above, not only a plurality of first travelable ranges 41a and 41b but also the second travelable range 42 as in the step S2. That is, the controller 17 (the travelable range calculator 175) is configured to calculate the second travelable range 42 regardless of whether the destination is set.

Figure 6:
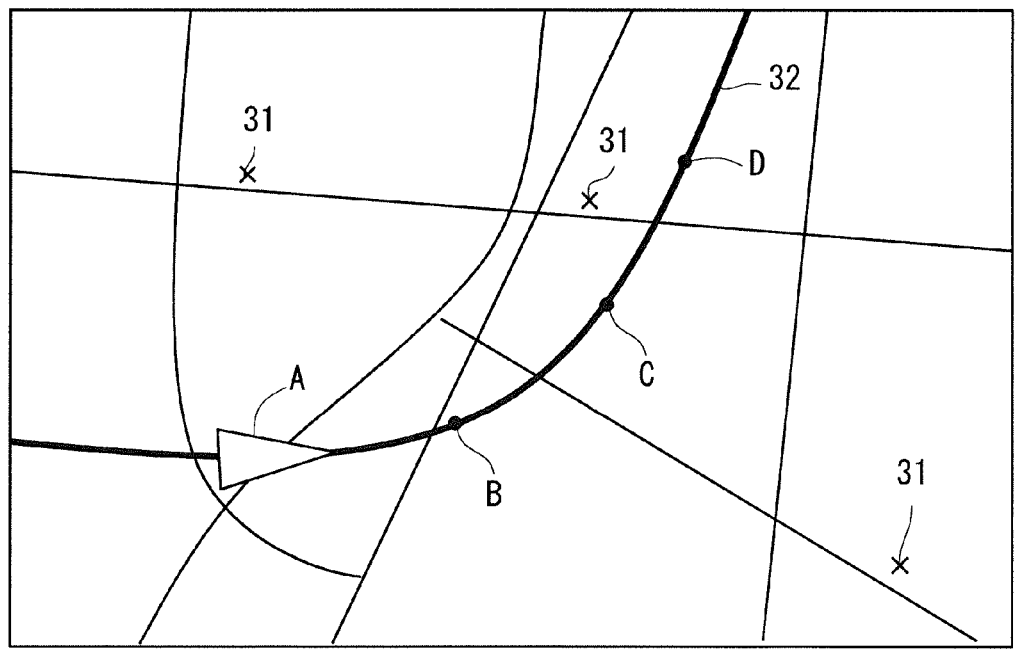
FIG. 6 illustrates the operation of the navigation apparatus according to the first embodiment.
Figure 7:
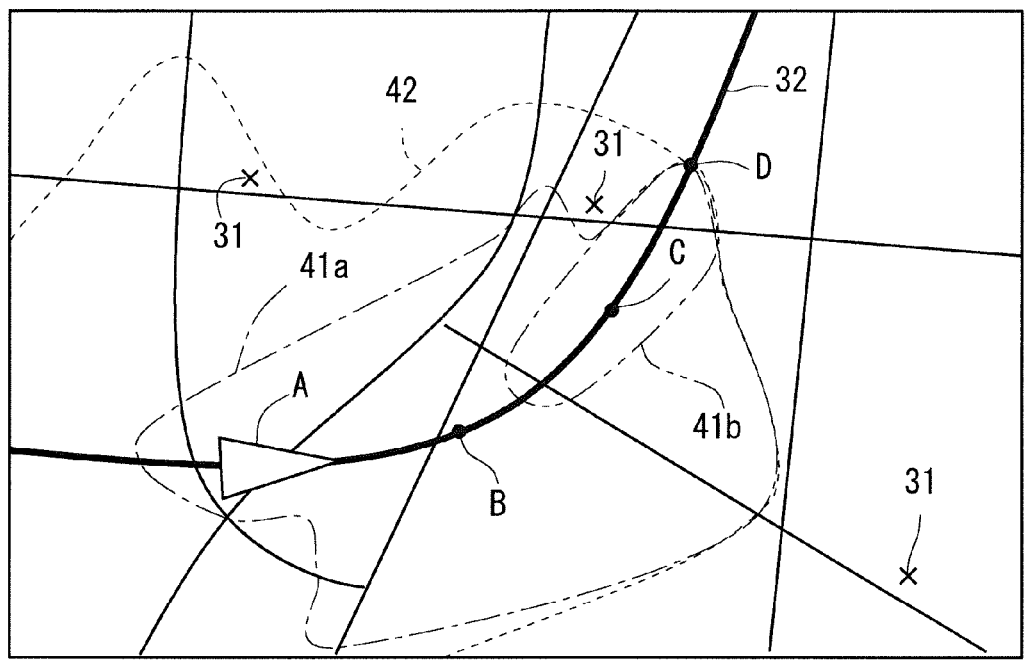
FIG. 7 illustrates the operation of the navigation apparatus according to the first embodiment.

Next, with reference to FIGS. 6 and 7, the calculation of the first travelable range by the controller 17 (the travelable range calculator 175) is described. FIG. 6 illustrates an example of the first travelable range in the middle of calculation in the step S7. FIG. 7 illustrates an example of the first travelable range in the end of calculation in the step S7. Although FIGS. 6 and 7 are similar to FIG. 4, FIG. 7 shows the plurality of travelable ranges 41a and 41b (the alternate long and short dashed lines and the alternate long and two short dashed lines) in addition to the details shown in FIG. 4.

In calculating the first travelable ranges 41a and 41b, the controller 17 firstly predicts the remaining amount of the electricity charged for the case that the own vehicle reaches the point on the retrieved route 32 beyond the current position A. The following description will be given assuming that points for which the remaining amount of the electricity charged is to be predicted (prediction target points) are a plurality of points B and C located at regular intervals on the retrieved route 32 between the current position A and a point D that is the intersection of the retrieved route 32 and the second travelable range 42. Note that the prediction target points are not limited to the points B and C and may be a key point (such as the intersection of the retrieved route 32 and another route) on the retrieved route 32 beyond the current position A.

The controller 17 calculates the remaining amount of the electricity charged at the prediction target points B and C by Expression (1) and Expression (2) described below.

[Math 1]

Predicted Remaining Amount of the Electricity Charged at the Point $B$=Remaining Amount of the Electricity Charged at the Current Position $A$−(Distance from the Current Position $A$ to the Point $B$/Travelable Distance per Unit Charged Electricity)     (1)

[Math 2]

Predicted Remaining Amount of the Electricity Charged at the Point $C$=Remaining Amount of the Electricity Charged at the Current Position $A$−(Distance from the Current Position $A$ to the Point $C$/Travelable Distance per Unit Charged Electricity)     (2)

Next, the controller 17 calculates the first travelable range 41a on the basis of the remaining amount of the electricity charged at the prediction target point B, the location of the prediction target point B, and the map information. That is, the controller 17 calculates the first travelable range 41a, which is assumed to be the range obtained from the calculation of the second travelable range 42 in the step S2 described above by substituting the remaining amount of the electricity charged at the prediction target point B and the location of the prediction target point B for the current remaining amount of the electricity charged that is included in the EV information and the current position A, respectively. The controller 17 may correct, as with the second travelable range 42, the first travelable range 41a according to the gradient and the type of the route.

Similarly, the controller 17 calculates the first travelable range 41b on the basis of the remaining amount of the electricity charged at the prediction target point C, the location of the prediction target point C, and the map information. That is, the controller 17 calculates the first travelable range 41b, which is assumed to be the range obtained from the calculation of the second travelable range 42 in the step S2 described above by substituting the remaining amount of the electricity charged at the prediction target point C and the location of the prediction target point C for the current remaining amount of the electricity charged that is included in the EV information and the current position A, respectively. The controller 17 may correct, as with the second travelable range 42, the first travelable range 41b according to the gradient and the type of the route.

Referring back to FIG. 2, in a step S8, the controller 17 determines whether the travelable range display is set to ON or OFF on the display setting shown in FIG. 3. If the travelable range display is set to ON, the processing proceeds to a step S9. If the travelable range display is set to OFF, the processing proceeds to a step S12.

In the step S9, the controller 17 determines whether the on-route display is set to ON or OFF on the display setting shown in FIG. 3. If the on-route display is set to ON, the processing proceeds to a step S10. If the on-route display is set to OFF, the processing proceeds to a step S11.

Figure 8:
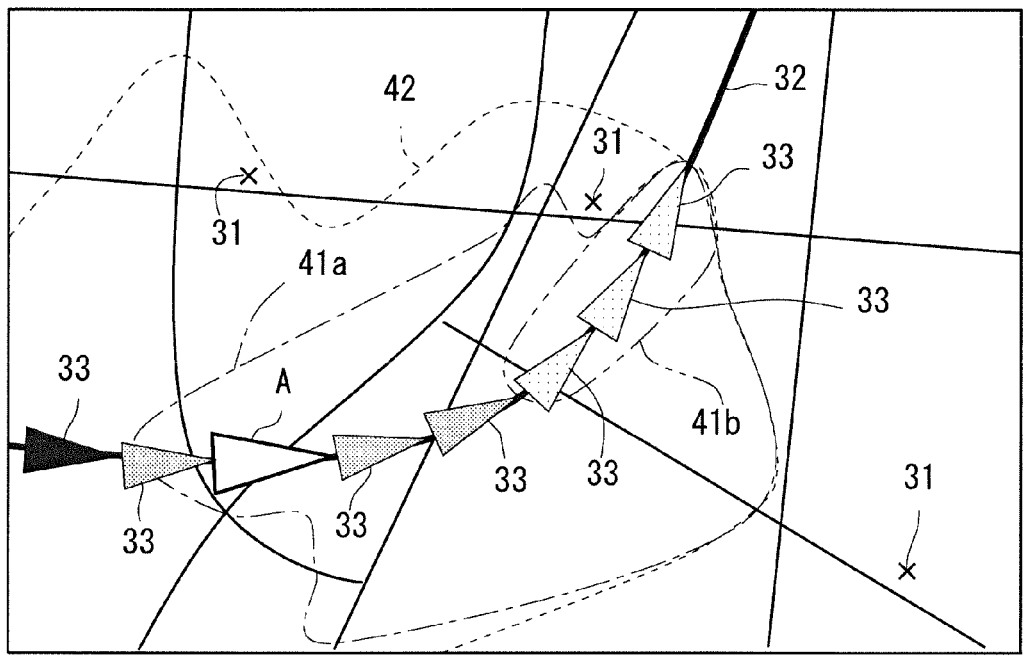
FIG. 8 illustrates the operation of the navigation apparatus according to the first embodiment.

If the charging station icon display is set to ON on the display setting shown in FIG. 3, the controller 17 causes, in the step S10, the touch-panel-equipped display 6 to display the details show in FIG. 8. That is, the controller 17 causes the touch-panel-equipped display 6 to display the current position A, the map showing the vicinity of the current position A, the charging stations 31, the retrieved route 32, the first travelable ranges 41a and 41b, and the second travelable range 42.

The controller 17 causes the plurality of first travelable ranges 41a and 41b calculated for the plurality of prediction target points B and C and the second travelable range 42 to be displayed in such a manner that the insides of the respective ranges are indicated by different hues (for example, blue, yellow, and red in the stated order), saturation, or lightness (that gradually changes, for example, from white to black) set by the user or that the boarders of the respective ranges are indicated by the different kinds of lines (such as the broken lines, the alternate long and short dashed lines, and the alternate long and two short dashed lines) set by the user. That is, the controller 17 causes the touch-panel-equipped display 6 to display the plurality of first travelable ranges 41a and 41b and the second travelable range 42 to be distinguishable from one another. Therefore, at a glance, the user can identify the plurality of first travelable ranges 41a and 41b and the second travelable range 42.

The controller 17 divides the retrieved route 32 corresponding to the plurality of first travelable ranges 41a and 41b and the second travelable range 42 and causes the divided sections of the retrieved route 32 to be displayed in such a manner that the divided sections are indicated by different hues (for example, blue, yellow, and red), saturation, or lightness (that gradually changes, for example, from white to black) set by the user or that the divided sections are indicated by triangles 33 that differ in hues (for example, blue, yellow, and red in the stated order), saturation, or lightness (that gradually changes, for example, from white to black) set by the user as shown in FIG. 8. That is, the controller 17 causes the touch-panel-equipped display 6 to display the divided sections of the retrieved route 32 to be distinguishable from one another. Therefore, at a glance, the user becomes aware of chances to turn back during driving on the retrieved route 32.

Meanwhile, if the charging station icon display is set to OFF on the display setting shown in FIG. 3, the controller 17 causes, in the above-mentioned step S10, the touch-panel-equipped display 6 to display the details shown in FIG. 8 (the current position A, the map showing the vicinity of the current position A, the retrieved route 32, the on-route triangles 33, the first travelable ranges 41a and 41b, and the second travelable range 42) except for the charging stations 31. Once the step S10 ends, the processing ends as shown in FIG. 2, which is not limited thereto. For example, after the step S10, the processing may return to the step S1 as needed or at a given point in time.

Referring back to FIG. 2, if the charging station icon display is set to ON on the display setting shown in FIG. 3, the controller 17 causes, in the step S11, the touch-panel-equipped display 6 to display the details shown in FIG. 8 (the current position A, the map showing the vicinity of the current position A, the charging stations 31, the retrieved route 32, the first travelable ranges 41a and 41b, and the second travelable range 42) except for the on-route triangles 33 in FIG. 8. At this time, the controller 17 causes the touch-panel-equipped display 6 to display the plurality of travelable ranges 41a and 41b and the second travelable range 42 to be distinguishable from one another as in the step S10. Meanwhile, if the charging station icon display is set to OFF on the display setting show in FIG. 3, the controller 17 causes the touch-panel-equipped display 6 to display, in the above-mentioned step S11, the details shown in FIG. 9 (the current position A, the map showing the vicinity of the current position A, the retrieved route 32, the travelable ranges 41a and 41b, and the second travelable range 42) except for the charging stations 31. Once the step S11 ends, the processing ends as shown in FIG. 2, which is not limited thereto. For example, after the step S11, the processing may return to the step S1 as needed or at a given point in time.

In the step S12, the controller 17 determines whether the on-route display is set to ON or OFF on the display setting shown in FIG. 3. If the on-route display is set to ON, the processing proceeds to a step S13. If the on-route display is set to OFF, the processing proceeds to a step S14.

Figure 10:
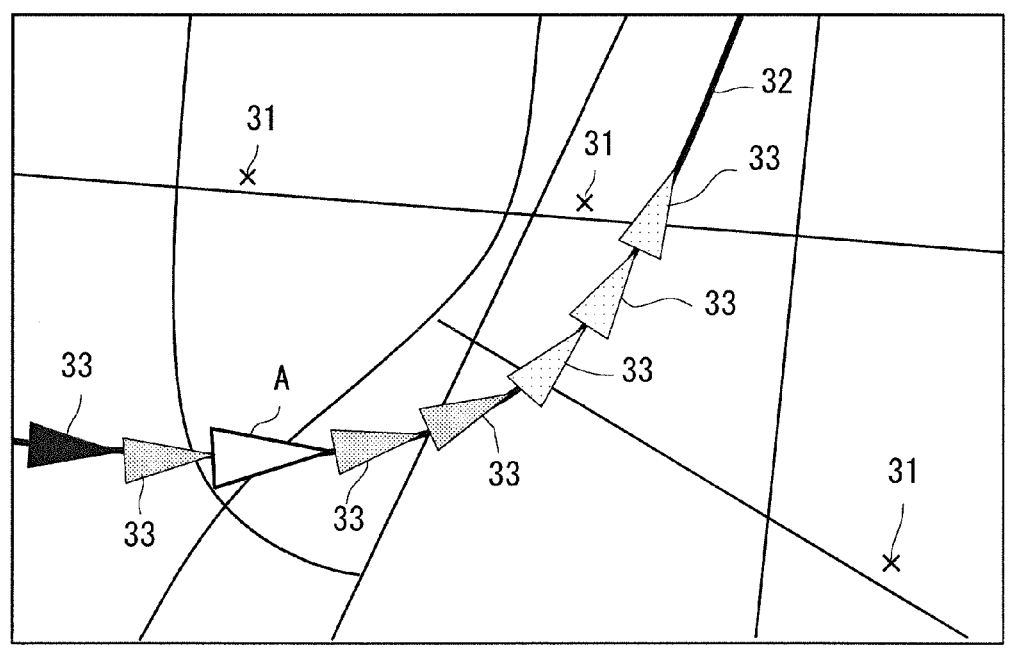
FIG. 10 illustrates the operation of the navigation apparatus according to the first embodiment.

If the charging station icon display is set to ON on the display setting shown in FIG. 3, the controller 17 causes, in the step S13, the touch-panel-equipped display 6 to display the details shown in FIG. 10 (the current position A, the map showing the vicinity of the current position A, the charging stations 31, the retrieved route 32, and the on-route triangles 33) except for the first and second travelable ranges 41a, 41b, and 42 in FIG. 8. If the charging station icon display is set to OFF on the display setting show in FIG. 3, meanwhile, the controller 17 causes, in the above-mentioned step S13, the touch-panel-equipped display 6 to display the details (the current position A, the map showing the vicinity of the current position A, the retrieved route 32, and the on-route triangles 33) except for the charging stations 31 in FIG. 10. Once the step S13 ends, the processing ends as shown in FIG. 2, which is not limited thereto. For example, after the step S13, the processing may return to the step S1 as needed or at a given point in time.

If the charging station icon display is set to ON on the display setting shown in FIG. 3, the controller 17 causes, in the step S14, the touch-panel-equipped display 6 to display the details shown in FIG. 5 (the current position A, the map showing the vicinity of the current position A, the charging stations 31, and the retrieved route 32). If the charging station icon display is set to OFF on the display setting shown in FIG. 3, meanwhile, the controller 17 causes, in the above-mentioned step S14, the touch-panel-equipped display 6 to display the details (the current position A, the map showing the vicinity of the current position A, and the retrieved route 32) except for the charging stations 31 in FIG. 5. Once the step S14 ends, the processing ends as shown in FIG. 2, which is not limited thereto. For example, after the step S14, the processing may return to the step S1 as needed or at a given point in time.

<Conclusion>

Figure 9:
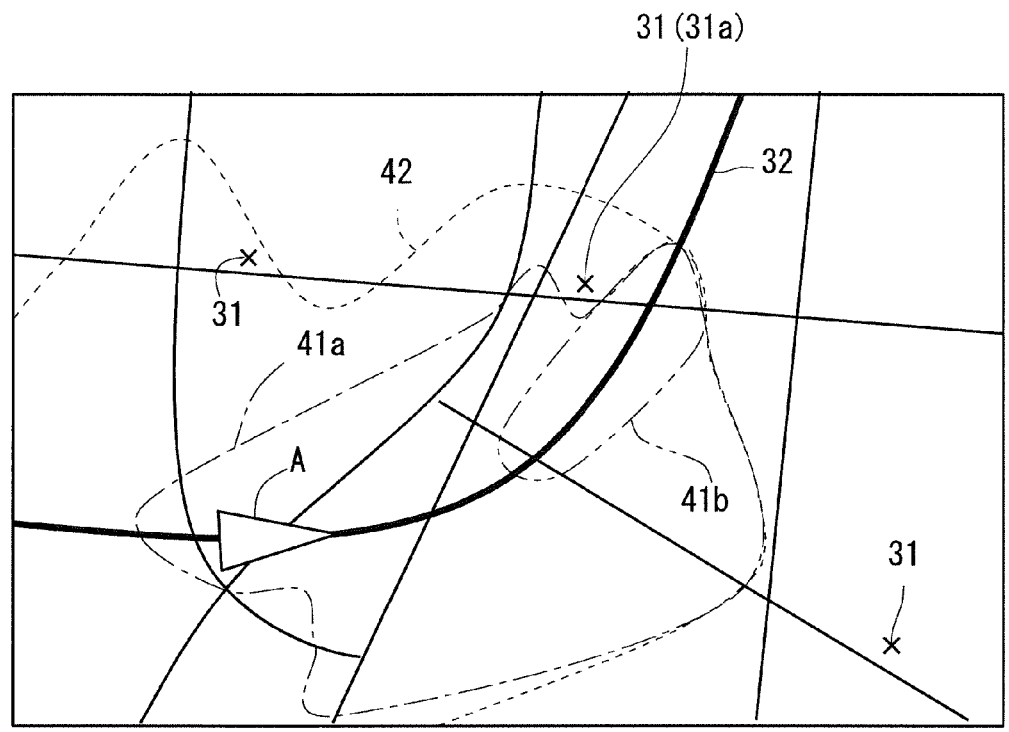
FIG. 9 illustrates the operation of the navigation apparatus according to the first embodiment.

Referring to the example shown in FIG. 9, assume that the travelable ranges 41a and 41b are not displayed and only the second travelable range 42 is displayed when the user desires to charge the vehicle at a charging station 31a out of the charging stations 31. In this case, the charging station 31a is displayed as being close to the retrieved route 32 and being located within the travelable range 42. Therefore, the user may judge that the vehicle, even in the case of traveling on the retrieved route 32, can reach the desired charging station 31a by turning to the left at the intersection near the charging station 31a.

However, as shown in FIG. 9, the desired charging station 31a is, in fact, located outside the first travelable ranges 41a and 41b. What this means is that the vehicle has to travel on another route that is different from the retrieved route 32 to reach the charging station 31a; that is, the vehicle traveling on the retrieved route 32 cannot reach the charging station 31a. Thus, if the first travelable ranges 41a and 41b are not displayed, the user may judges as described above, and thus, the vehicle may keep traveling on the retrieved route 32. Consequently, there is a possibility that the vehicle may become out of charge before reaching the charging station 31.

Alternatively, the navigation apparatus 1 according to the first embodiment calculates the first travelable ranges 41a and 41b in which the vehicle is allowed to travel from the current position through at least a part of the retrieved route and displays the first travelable ranges 41a and 42b on the touch-panel-equipped display 6. Therefore, the user is aware in advance that the vehicle cannot reach the charging station 31a (the desired facility or point) by traveling on the retrieved route 32. Thus, the user is allowed, in advance, to change the travel route to head for the charging station 31 or to charge the vehicle at another charging station 31.

According to the first embodiment, the plurality of first travelable ranges 41a and 41b are calculated for each of the plurality of points B and C. Thus, the plurality of first travelable ranges 41a and 41b can be displayed. Therefore, at a glance, the user becomes aware of how far the vehicle can barely travel as the traveling on the retrieved route 32 goes on.

Moreover, according to the first embodiment, the second travelable range 42 is calculated regardless of whether the destination is set. Thus, the second travelable range 42 can be displayed regardless of whether the destination is set. Therefore, at any given time, the user becomes aware of the maximum range in which the vehicle is allowed to run on the current remaining amount of the electricity charged at a glance.

In the above description, the controller 17 determines whether the travelable range display is set to ON or OFF on the display setting screen shown in FIG. 3 and collectively controls the displaying of the first and second travelable ranges 41a, 41b, and 42 on the basis of the determination result. However, the operation is not limited thereto. The displaying of the first travelable ranges 41a and 41b and the second travelable range 42 may be individually controlled through the individual ON-OFF setting of the first travelable ranges 41a and 41b and the second travelable range 42 on the display setting screen shown in FIG. 3.

<First Modification>

In a first modification, a notifier that is capable of providing a notification of a need for charging the vehicle by voice or display for user is mounted on the own vehicle. The following description will be given assuming that the notifier includes the speaker 7 capable of providing a notification by voice (alarm) and the touch-panel-equipped display 6 capable of providing a notification by display (telop display).

In the first modification, the controller 17 determines, on the basis of the map information, the presence or absence of the charging stations 31 in each of the plurality of the first travelable ranges 41 and 41b and the second travelable range 42 and the above-mentioned notifier notifies an alarm depending on the determination results.

FIG. 11 shows a screen for setting the notification by the above-mentioned notifier (hereinafter referred to as "notification setting screen"). The notification setting screen is displayed on the touch-panel-equipped display 6 through the control of navigation apparatus 1. In the item "presence or absence of charging stations in each range," each range (in this case, each of the first and second travelable ranges 41a, 41b, and 42) is provided with "○" indicating that the presence of the charging station 31 is determined or "×" indicating that absence of the charging station 31 is determined.

The "presence or absence of notification" is set for each of a plurality of states (in this case, eight states) obtained by combining "○" and "×" described above. Any one of "○," "●," and "×" is provided to each of the "presence or absence of alarm" or the "presence or absence of telop display," which are included in the "presence or absence of notification," to thereby set the presence or absence of notification. In this case, "○" indicates that a notification is given and "○" can be changed to "×," "×" indicates that a notification is not given and "×" can be changed to "○," and "●" indicates that a notification is surely given and "●" cannot be changed to "×."

To set "○" and "×" for the presence and absence of notification on the notification setting screen, the user inputs the setting of "○" or "×" to the touch-panel-equipped display 6 when the notification setting screen is displayed on the touch-panel-equipped display 6. The setting input by the user is stored in the information storage 11 via, for example, the touch-panel-equipped display 6. Therefore, the navigation apparatus 1 according to the first modification is configured to be capable of giving a notification in response to "○" for the "presence or absence of notification" set by the user.

Figure 12:
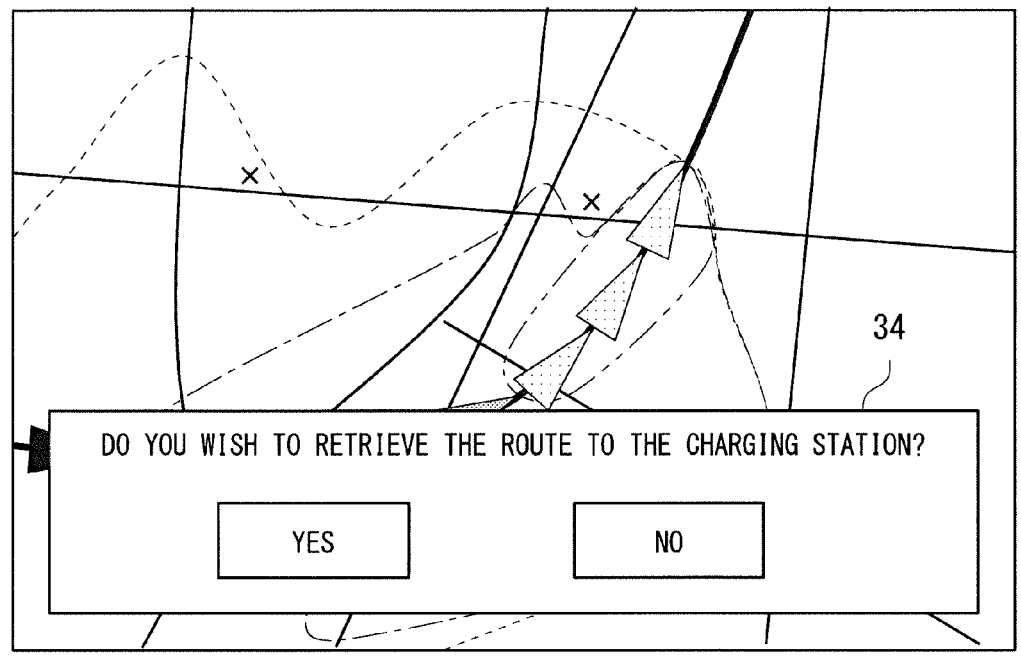
FIG. 12 illustrates an operation of the navigation apparatus according to the first modification of the first embodiment.

Next, an operation performed by the controller 17 on the basis of the example of the setting of the notification setting screen shown in FIG. 11 is described in detail. In a "state 1," in which the presence of the charging station 31 is determined for each of the first and second travelable ranges 41a, 41b, and 42, the alarm is set to "×" and the telop display is set to "○." Thus, upon receipt of the determination result, the controller 17 causes the touch-panel-equipped display 6 to display, as shown in FIG. 12, a telop (selection telop 34) for choosing whether to retrieve the route to the charging station 31 without voice output of an alarm. That is, the controller 17 causes the touch-panel-equipped display 6 to display the guidance on the retrieval of the route to the charging station 31.

In a "state 2," a "state 3," and a "state 5," in which the presence of the charging station 31 is determined for any two of the first and second travelable ranges 41a, 41b, and 42, the alarm is set to "○" and the telop display is set to "○." Thus, upon receipt of the determination result, the controller 17 causes the speaker 7 to output an alarm by voice, and at the same time, causes the touch-panel-equipped display 6 to display the selection telop 34 (the guidance on the retrieval of the route to the charging station 31) similar to the one described above. At this time, the selection telop 34 in the "state 1" may include the additional text such as "Please be aware that there are few charging stations around the vehicle."

In a "state 4," a "state 6," and a "state 7," in which the presence of the charging station 31 is deteimined for any one of the first and second travelable rages 41a, 41b, and 42, the alarm is set to "●" and the telop display is set to "●" Thus, upon receipt of the determination result, the controller 17 causes the speaker 7 to output an alarm by voice. At the same time, the controller 17 causes the touch-panel-equipped display 6 to display the telop indicating "The route to the charging station is now being retrieved." After that, the controller 17 automatically retrieves the route to the charging station 31 and causes the retrieval result to be displayed. At this time, the controller 17 may automatically provide the guidance on the way to the charging station 31 along the retrieved route.

In a "state 8," in which the absence of the charging station 31 is determined for all of the first and second travelable ranges 41a, 41b, and 42, the alarm is set to "●" and the telop display is set to "●" Thus, upon receipt of the determination result, the controller 17 causes the speaker 7 to output an alarm by voice. At the same time, the controller causes the touch-panel-equipped display 6 to display the telop indicating low chance of charging the vehicle at the charging station 31 shown on the map information. At this time, the controller 17 may cause the telop indicating the telephone number of a public transport agency such as the Japan Automobile Federation (JAF) or the telephone number of an automobile dealer located close to the current position A to be additionally displayed.

The navigation apparatus 1 according to the first modification described above determines the presence or absence of the charging station 31 for each of the plurality of first travelable ranges 41a and 41b and the second travelable range 42 on the basis of the map information and causes the above-mentioned notifier to notify an alarm depending on the determination results. In this configuration, alarms can be provided in stages, so that the user is allowed to drive at ease with as little unnecessary worry about running out of charge.

In the first modification, the notification by the above-mentioned notifier (in this case, the touch-panel-equipped display 6 and the speaker 7) and the displaying of the first travelable ranges 41a, 41b, and 42 are set to ON or OFF, depending on the preset details (FIG. 3 and FIG. 11). This allows the notification and the displaying that are adapted to the travel condition, the usage condition, and the age bracket of the user, thereby providing the user-friendly navigation apparatus.

The controller 17 may be configured such that the notification according to the details of the notification setting (FIG. 11) is not provided but the displaying according to the details of the display setting (FIG. 3) is provided. Alternatively, the controller 17 may be configured such that the displaying according to the details of the display setting (FIG. 3) is not provided but the notification according to the details of the notification setting (FIG. 11) is provided.

In the first modification, the guidance on the retrieval of the route to the charging station 31 (for example, the selection telop 34 described above) is displayed depending on the determination results described above. This can prompt the user to start operation for retrieving the route when the need for the route retrieval increases.

The above description has been given assuming that the notifier includes the speaker 7 capable of providing a notification by voice and the touch-panel-equipped display 6 capable of providing a notification by display. However, the configuration is not limited thereto, and the notifier may include only the speaker 7 capable of providing a notification by voice or may include only the touch-panel-equipped display 6 capable of providing a notification by display.

<Second Modification>

Figure 13:
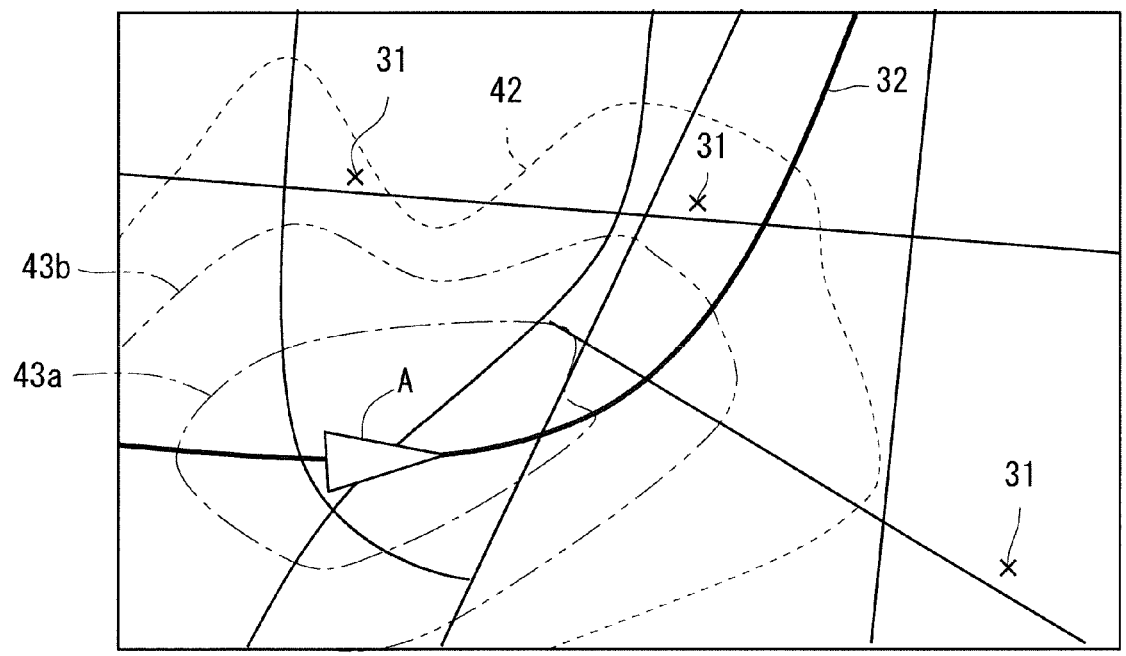
FIG. 13 illustrates an operation of the navigation apparatus according to a second modification of the first embodiment.

FIG. 13 is a chart for describing an operation of the navigation apparatus 1 according to a second modification. As shown in FIG. 13, the controller 17 (the travelable range calculator 175) according to the second modification calculates overlapping ranges 43a and 43b that overlap the second travelable range 42 relative to the current position A in a nested manner and causes the touch-panel-equipped display 6 to display the overlapping ranges 43a and 43b to be distinguishable from the second travelable range 42.

Specifically, the controller 17 multiplies the travelable distance according to the remaining amount of the electricity charged that has been described in the step S2 in the first embodiment by the predetermined percentage (for example, 33% or 66%). Then, the controller 17 substitutes the distance obtained by the multiplication for the travelable distance according to the remaining amount of the electricity charged that has been described above, to thereby perform the calculation as in the calculation of the second travelable range 42. Consequently, the controller 17 calculates the overlapping ranges 43a and 43b that are concentric with the second travelable range 42 as shown in FIG. 13. Then, the controller 17 causes the touch-panel-equipped display 6 to display the overlapping ranges 43a and 43b obtained by the calculation to be distinguishable from the second travelable range 42.

The method for displaying the overlapping ranges 43a and 43b to be distinguishable from the second travelable range 42 may be similar to the above-described method for displaying the first travelable ranges 41a and 41b and the second travelable range 42 to be distinguishable from one another. The description has been given on the case in which the overlapping ranges 43a and 43b are displayed in FIG. 4, which is not limited thereto. The overlapping ranges 43a and 43b may be displayed in, for example, FIG. 8. In this case, the controller 17 causes the overlapping ranges 43a and 43b to be displayed such that they are distinguishable from the first travelable ranges 41a and 41b in a similar manner to the displaying method described above.

In the navigation apparatus 1 according to the second modification described above, the overlapping ranges 43a and 43b are calculated. Thus, the overlapping ranges 43a and 43b can be displayed. Therefore, at a glance, the user can identify the range for worry-free traveling.

In the above configuration, the presence or absence of the charging station 31 may be determined for each of the overlapping ranges 43a and 43b on the basis of the map information and then the above-mentioned notifier may notify an alarm depending on the determination results as in the first modification. In this configuration, alarms can be provided in stages, so that the user is allowed to drive at ease with as little unnecessary worry about running out of charge.

<Modification of Map-and-AV-Information Input Unit 15>

The map-and-AV-information input unit 15 may be a connection terminal such as a universal serial bus (USB) that swaps information with portable media directly or via wire transmission. The portable media may include a portable music player or a device installed with the function of the portable music player. The map-and-AV-information input unit 15 may swap information with a portable information communication device such as a mobile cellular telephone or a portable tablet by wire or wireless transmission. As opposed to "wire," "wireless" means that connection is made without a line and it does not matter how the information is swapped (for example, by radio waves or light).

The map-and-AV-information input unit 15 may include a built-in communication device that swaps information with the information center that is separately located and may swap, for example, one of the map information and the AV information described above or other information by the communication device. Alternatively, the map-and-AV-information input unit 15 may swap one of the map information and the AV information described above or other information via the portable information communication device described above instead of including the built-in communication device.

<Other Modifications>

In the above description, the typical constituent elements including the information updater 12, the current position detector 13, the facility searching unit 172, the route retrieving unit 173, the guidance providing unit 174, the travelable range calculator 175, the information rendering unit 176, the display controller 177, and the voice controller 178 are located outside the control unit 171. If this is the case, these constituent elements may be individually formed of separate pieces of hardware.

Alternatively, the functions of the constituent elements including the information updater 12, . . . , and the voice controller 178 may be included in the control unit 171. If this is the case, the control unit 171 may be formed of one piece of hardware such as a central processing unit (CPU) or a microcomputer and the control unit 171 may execute the program stored in, for example, the above-mentioned HDD, to thereby implement the functions of the above-mentioned constituent elements. Although an example of the controller 17 that is implemented by the CPU as the software has been described above, the controller 17 may be substituted by a signal processing circuit that implements the functions of the controller 17 with an electric circuit of the hardware. The controller 17 of the software and the signal processing circuit of the hardware are collectively referred to as processing circuitry.

The navigation apparatus 1 described above is applicable not only to the on-vehicle navigation apparatus, namely, the car navigation apparatus, but also to the navigation apparatus formulated as the system by combining, for example, a portable navigation device apparatus (PNDs), a portable terminal (such as a mobile cellular telephone, a smartphone, and a tablet) that can be mounted on the vehicle (the EV in relation to the present invention), and a server as appropriate. If this is the case, each function or each constituent element of the navigation apparatus 1 described above is dispersedly located in the devices constituting the above-mentioned system.

The navigation apparatus 1, which is applied to the mobile cellular telephone, may cause a call to be made to a public transport agency such as the JAF or an automobile dealer located close to the current position A when the absence of the charging station 31 is determined for all of the first and second travelable ranges 41a, 42b, and 42 described in the first modification (for the state 8 shown in FIG. 11).

In the present invention, each embodiment can be appropriately varied or omitted within the scope of the invention.

EXPLANATION OF REFERENCE SIGNS 1 navigation apparatus, 6 touch-panel-equipped display, 7 speaker, 11 information storage, 13 current position detector, 14 instruction input unit, 16 EV information input unit, 17 controller, 31 charging station, 32 retrieved route, 34 selection telop, 41a, 41b first travelable range, 42 second travelable range, 43a, 43b overlapping range.

The invention claimed is:

1. A navigation apparatus to be mounted on or used in a vehicle that runs on electricity charged in a battery, said navigation apparatus comprising:
   an information storage configured to store map information;
   a current position detector configured to detect a current position of said vehicle;
   an instruction receiver configured to receive a setting of a destination; and
   a processing circuitry configured to, in response to said destination being set, retrieve a route to said destination from said map information and calculate a first travelable range in which said vehicle is allowed to travel from said current position through at least a part of said route on the basis of said route, a remaining amount of said electricity charged in said battery according to information received by said navigation apparatus, said current position, and said map information to cause a display to display said first travelable range,
   wherein said processing circuitry predicts a remaining amount of said electricity charged for a case in which said vehicle reaches a point on said route beyond said current position, and calculates said first travelable range so that each position on said first travelable range represents an allowed driving distance of said vehicle from said point based on the predicted remaining amount of said electricity charged and said map information,
   said processing circuitry is configured to
      calculate, regardless of whether said destination is set, a second travelable range in which said vehicle is allowed to travel from said current position through a given route on the basis of the remaining amount of said electricity charged, said current position, and said map information to cause said display to display said second travelable range;

switch, depending on whether said destination is set, between a mode simultaneously displaying both said first and second travelable ranges and a mode displaying only said second travelable range;

calculate said second travelable range so that each position on said second travelable range represents an allowed driving distance of said vehicle from said current position based on the remaining amount of said electricity charged and said map information;

calculate said first travelable range a number of times for different points on said route thereby calculating a plurality of first travelable ranges for a respective plurality of points;

cause said display to simultaneously display said plurality of first travelable ranges calculated for said plurality of points and to display said second travelable range to be distinguishable from one another; and calculate overlapping ranges that overlap said second travelable range relative to said current position in a nested manner and cause said display to display said overlapping ranges to be distinguishable from said plurality of first travelable ranges and said second travelable range.

2. The navigation apparatus according to claim 1, wherein said processing circuitry is configured to divide said route corresponding to said plurality of first travelable ranges calculated for said plurality of points and said second travelable range and cause said display to display divided sections of said route to be distinguishable from one another.

3. The navigation apparatus according to claim 1, wherein
a notifier is configured to provide a notification by at least one of voice and display is mounted on said vehicle, and
said processing circuitry is configured to determine, on the basis of said map information, the presence or absence of a charging station in each of said plurality of first travelable ranges calculated for said plurality of points and said second travelable range and cause said notifier to notify an alarm depending on determination results.

4. The navigation apparatus according to claim 3, wherein said processing circuitry is configured to set, depending on preset details, at least one of the notification of said notifier and displays of said first and second travelable ranges to ON or OFF.

5. The navigation apparatus according to claim 3, wherein said processing circuitry is configured to display, depending on said determination results, a guidance on retrieval of a route to said charging station on said display.

6. The navigation apparatus according to claim 1,
wherein, when a distance between said current position and a location of said point is longer than a corresponding maximum driving distance of said first travelable range, said current position is shown as being outside of said first travelable range displayed by said display.

7. The navigation apparatus according to claim 1, wherein said point on said route for use in calculating said first travelable range lies in between said current position and a point reachable by said vehicle traveling from said current position through said route on the basis of the remaining amount of said electricity charged.

* * * * *